Jan. 8, 1963          O. D. ADKINS          3,072,439

AUTOMATIC TAIL GATE OPERATING MECHANISM FOR DUMP TRUCKS

Filed Dec. 24, 1958          2 Sheets-Sheet 1

INVENTOR.
OREL D. ADKINS
BY
McMorrow, Berman & Davidson
ATTORNEYS

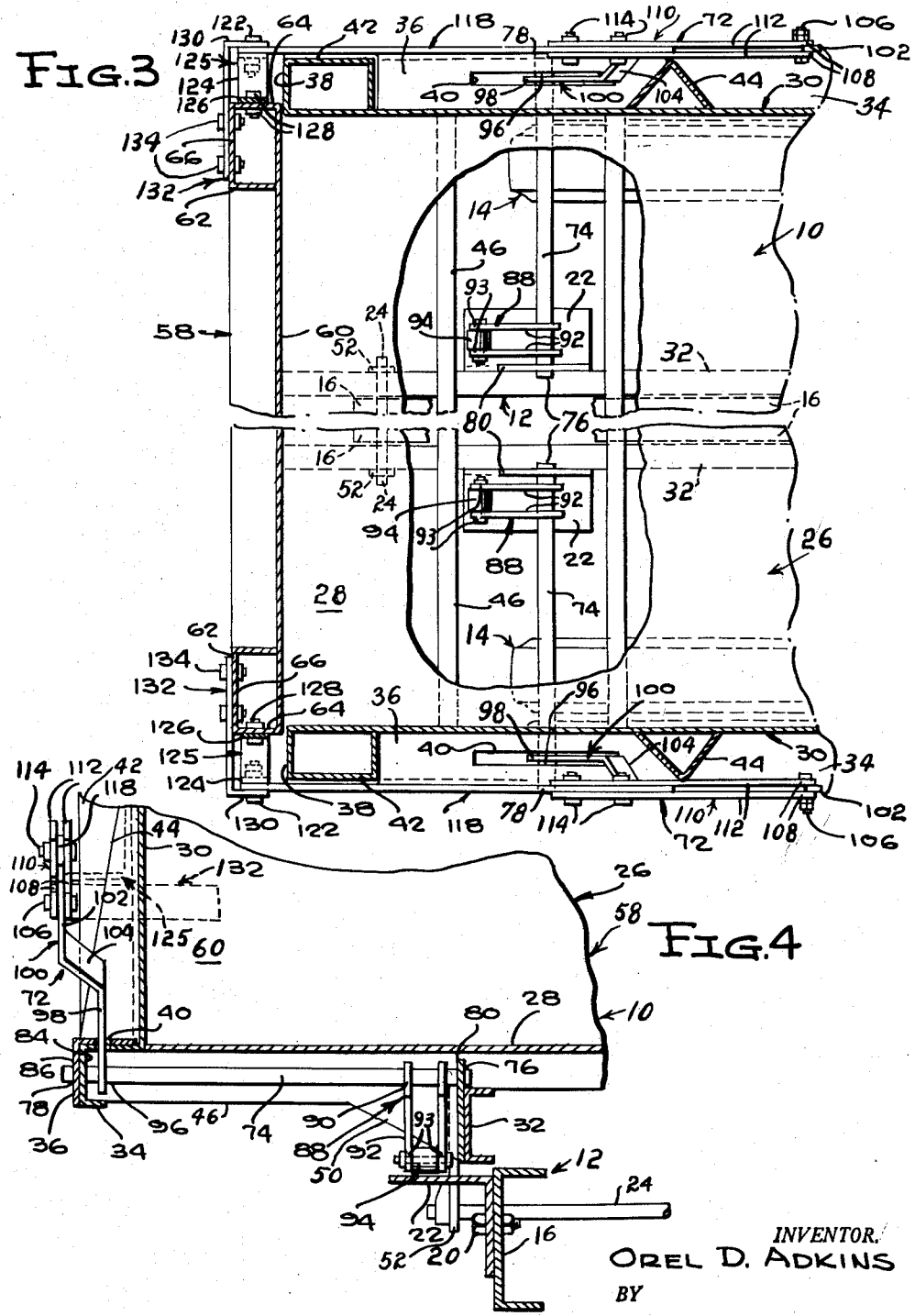

United States Patent Office 3,072,439
Patented Jan. 8, 1963

3,072,439
AUTOMATIC TAIL GATE OPERATING MECHANISM FOR DUMP TRUCKS
Orel D. Adkins, P.O. Box 1143, Snyder, Tex.
Filed Dec. 24, 1958, Ser. No. 782,722
2 Claims. (Cl. 298—23)

This invention relates to an improved automatic tail gate operating mechanism for dump trucks.

The primary object of the invention is to provide simpler, less costly, and more easily installed mechanism of this character which is more efficient and reliable in operation.

Another object of the invention is to provide mechanism of the character indicated above which has simple and easily adjustable means for holding a tail gate in selected partly open positions, while the truck body is in a rearwardly tilted position, so that the tail gate and the truck body then serves as a controlled spreader of material carried by the truck body.

A further object of the invention is to provide mechanism of the character indicated above which is composed of a small number of simple and easily assembled parts, and is devoid of parts which are subject to early deterioration and require frequent replacement.

Other objects and advantageous features of the invention will be apparent from the following description and the accompanying drawings, wherein, for purposes of illustration only, a specific form of the invention is set forth in detail.

In the drawings:

FIGURE 3 is an enlarged and contracted fragmentary horizontal section, taken on the line 3—3 of FIGURE 1; and FIGURE 4 is an enlarged and fragmentary vertical transverse section taken on the line 4—4 of FIGURE 1.

Figure 1:
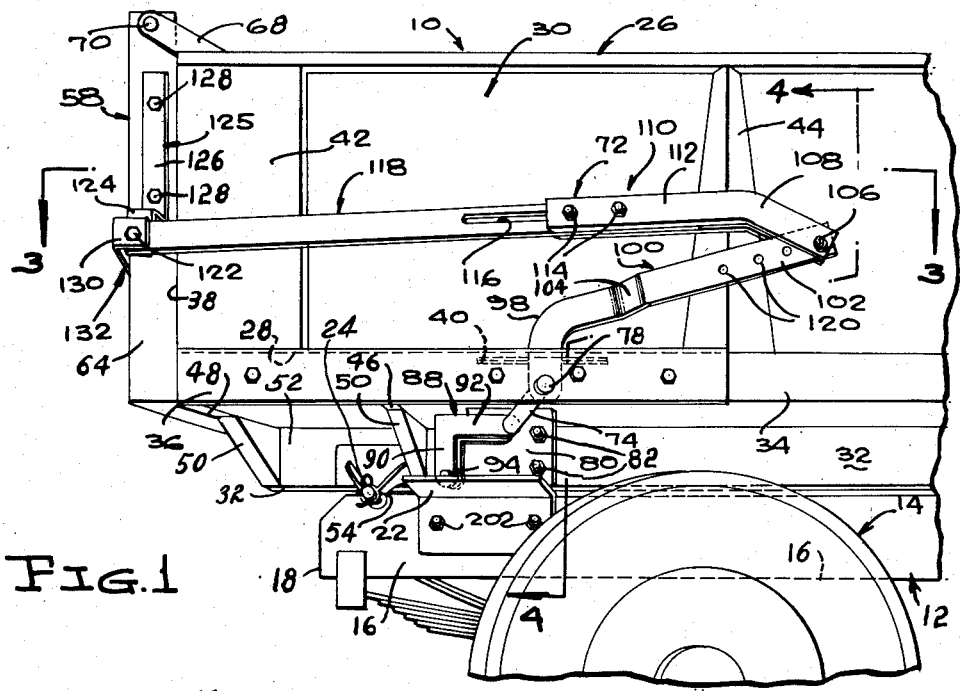
FIGURE 1 is a fragmentary right-hand side perspective view of the rear of a dump truck showing mechanism of the invention installed thereon and locking the tail gate in closed position and the truck body in depressed horizontal untilted position.

Referring in detail to the drawings, wherein like numerals designate like parts throughout the several views, the numeral 10 generally designates a dump truck having a stationary chassis 12 mounted on wheel 14, the chassis 12 having longitudinal side members 16 on whose laterally outward sides near the rear ends 18 thereof are fixed, as indicated at 20, horizontal outwardly projecting brackets 22, which are substantially on a level with or close to the tops of the side members 16, as shown in FIGURE 4. A horizontal transverse shaft 24, or separate shafts for each side member 16, extend through the side members 16 near their rear ends 18 and project therefrom.

The truck 10 further comprises a dump body, generally designated 26, which comprises a bottom wall or bed 28, upstanding side walls 30, a pair of laterally spaced ribs 32 extend longitudinally spacedly along and below the bottom wall 28 and are spaced inwardly from the side walls 30. As shown in FIGURE 4, the side walls 30 combine with the bottom wall 28 to have an inverted L-shaped reinforcing flange 34 which is overlaid exteriorly by another L-shaped flange 36, which extend to the rear ends 38 of the side walls. The horizontal elements of these flanges are traversed by a common longitudinal guide slot 40. At and defining the rear ends 38 of the side walls are hollow vertical posts 42 which are on the sides of the side walls 30, and also fixed on the sides of the side walls at points spaced forwardly from the posts 42 are vertical hollow triangular cross section combined reinforcing posts and mechanism guides 44.

Figure 2:
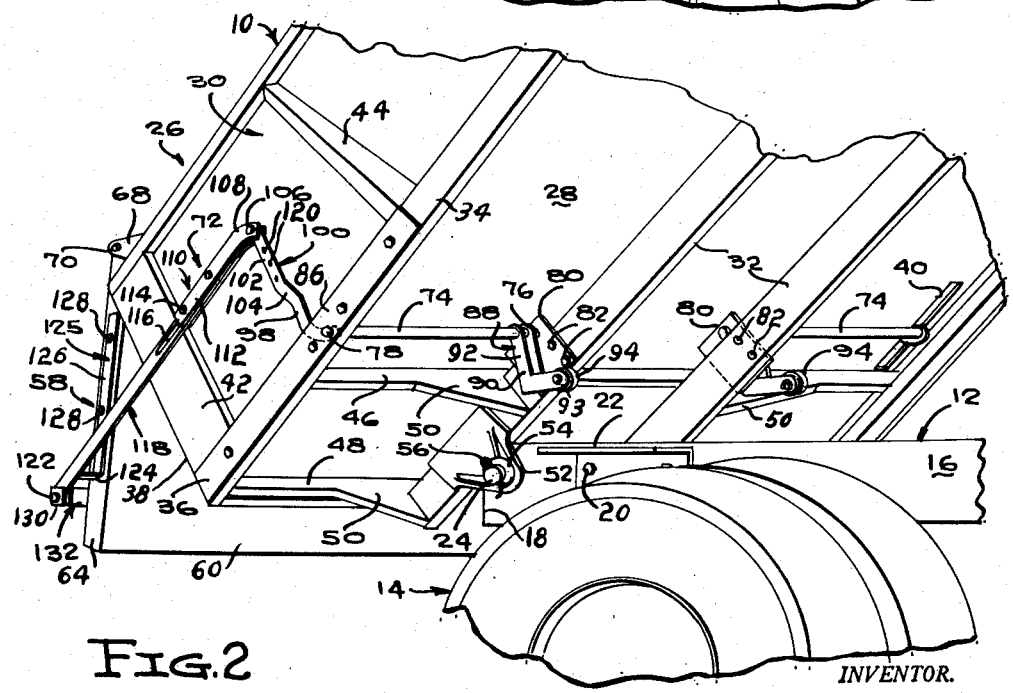
FIGURE 2 is a fragmentary bottom perspective view, showing the tail gate in open position and the truck body in a rearwardly tilted position.

A pair of forwardly and rearwardly spaced front and rear transverse cross members 46 and 48 are fixed to and depend from the body bottom wall 28, at the rear end of the body 26, and having transversely spaced depending portions 50, to which the longitudinal ribs 32 are fixed and whereby the ribs 32 are spaced downwardly from the body bottom wall 28, as shown in FIGURES 2 and 4. As also shown in these figures, the members 16 and 32 are preferably of channel cross section. Fixed on the outer sides of the ribs 32 at points between the cross members 46 and 48 are depending vertical ears 52 which are journaled on the ends of the shaft 24, and are maintained thereon by collars 54 retained by such as cotter pins 56.

A tail gate, generally designated 58, extends across the rear end of the dump body 26 and comprises a vertical wall 60 having hollow vertical reinforcing posts 62 fixed on its rear side, which have side portions 64 and rear portions 66. As shown in FIGURE 3, the wall 60 of the tail gate 58 is adapted, in its closed position only, to bear against the body side wall posts 42. Rearwardly projecting ears 68 fixed on the upper edges of the body side walls 30 carry pivots 70 which extend through the upper ends of the portions 64 of the gate posts 62, whereby the gate 58 is mounted on the body 26 to swing between closed and open positions.

The foregoing is generally descriptive of a typical and conventional dump truck construction, and forms no part of the present invention, except in combination with the tail gate operating mechanism of the present invention, as hereinafter described.

The illustrated operating tail gate operating mechanism comprising two similar but reversed units 72 which are installed on opposite sides of the dump body 26 and which operate independently of each other except that tilting movements of the dump body 26 relative to the truck chassis 12 acts to operate both units simultaneously and similarly. An advantage of this arrangement is that should one "half" of the mechanism at one side of the body 26 get out of order, it can be separately repaired or replaced without disturbing the other "half," and that in certain cases, the said other "half" can serve to operate the tail gate 58 by itself.

Each unit 72 comprises a transverse horizontal rock shaft 74 which extends between and is journaled at its ends, as indicated at 76 and 78, as shown in FIGURE 2, in the upstanding end of a bearing plate 80, secured, as indicated at 82, to the outer side of a related rib 32 at a point forwardly of the front cross member 46, and through the vertical portions 84 and 86 of the lower side wall flanges 34 and 36, respectively, as shown in FIGURE 4. An L-shaped clevis lever 88 has the upper ends of its vertical arms or standards 90 circumposed on and fixed to the shaft 74 adjacent to the plate 80, and carries between the free ends of its horizontal arms or front portions 92, as indicated at 93, a roller 94 which is arranged to rollably and supportably bear upon the bracket plate 22 on the related truck chassis side member 16, as the dump body 26 approaches the chassis 12 upon its return to a horizontal position from a rearwardly tilted dumping position; and as the dump body 26 starts away from the chassis 12. As shown in FIGURE 1, the lever 88, being initialy behind the pivotal axis of the shaft 74, in a pendant position, is tilted upwardly and forwardly, or in a clockwise direction, when its roller 94 engages the top of the bracket plate 22, so as to assume a right-angular, reclining position, in which it is maintained by the weight of the dump body 26.

Fixed, as indicated at 96, on an end part of the shaft 74 is the free end of the lower J-shaped portion 98 of an upstanding lever 100, which has a straight upper portion 102 which is offset with respect to the lower portion 98, as indicated at 104. The lower lever portion 98 extends through and moves in the slot 40 in the lower dump body side wall flanges 34 and 36, as shown in FIGURES 3 and 4.

Pivoted, as by a bolt 106, to the upper end of the upper lever portion 102, are the forward ends of the forwardly declined forward end portions 108 of two longitudinally elongated and laterally spaced adjustment plates 110, which have straight rear portions 112 which have therethrough two longitudinally spaced clamping bolts 114 which pass through a longitudinal slot 116 in the forward end portion of a longitudinally elongated connecting rod 118, the straight rear portions 112 of the plates 110 being coextensive with and at the opposite sides of the connecting rod 118. The pivot bolt 106 can be selectively positioned, for adjusting purposes, in any one of several bolt holes 120 which are provided along the upper lever portion 102 of the lever 100, as hereinafter described. In the closed position of the tail gate 58, as shown in FIGURE 1, the lever 100 is in a forwardly inclined position, whereas in the substantially fully open position of the tail gate 58, as shown in FIGURE 2, the lever 100 is in a substantially perpendicular position.

Operative connection between the rear end of the connecting rod 118 and the tail gate 58 is made by a pivot bolt 122 passing through the spaced depending lower arm 124 of a vertical bracket 125 which has an upper arm 126 which is fixed to the side portion 64 of the related gate post 62, as by bolts 128, so that the pivot bolt 122 is at a point preferably slightly below the midheight of the gate 58. The rear end of the connecting rod 118 bears against the lower bracket arm 124 and is confined on the pivot bolt 122 between the arm 124 and a forwardly extending arm 130 on the outer end of a strap bracket 132, which is secured, as indicated at 134, to the rear portion 66 of the related gate post 62, with the pivot bolt 122 extending also through the strap bracket arm 130.

In operation, as the dump body 26 is tilted upwardly and rearwardly relative to the truck chassis 12, by operation of suitable tilting mechanism (not shown), the force of gravity swings the tail gate 58 away from the open rear end of the dump body 26, to the extent permitted by the engagement of the lower roller 94 with the bracket plate 22, as the roller rolls forwardly therealong and the lever 88 begins to swing or rotate downwardly and forwardly. The adjustable linkage constituted by the lever 100, the adjustment plates 112, and their pivot and clamping bolts 106 and 114, can be adjusted by shortening the effective lengths of the lever 100 and/or of the connecting rod 118, so that, in partly rearwardly tilted position of the dump body 26, the rollers 94 remain in contact with the bracket plates 22, and limit the opening of the tail gate 58 to selected partially open positions, so that dumping of material through the open rear end of the dump body 26 is limited, as for controlled material spreading operations.

However, where unrestricted dumping of material from the dump body 26 is desired, the body 26 is tilted upwardly and rearwardly beyond such partially tilted position, to an elevated position in which the lower rollers 94 are out of contact with the bracket plates 22, the tail gate 58 is freed to swing back and forth, of its own weight, in fully open relation to the rear end of the dump body.

When, after a dumping operation, the dump body is tilted downwardly and forwardly toward horizontal fully depressed position upon the truck chassis 12, gravity serves to freely swing the tail gate 58 toward the open rear end of the dump body 26, and in so doing swings the roller levers 88 from the position in which the rollers 94 are forwardly of and below the shaft 74, the position of FIGURE 2, to the position in which the rollers 94 are rearwardly of and below the shaft 74 and in position to engage the bracket plates 22, the position of FIGURE 1. As the dump body approaches its fully-depressed position, the rollers 94 roll rearwardly along the tops of the bracket plates 22 until, at full depression of the dump body 26, the levers 88 are in their rearmost reclining positions, as shown in FIGURE 1, wherein the levers 88 are in effect in over-center lock positions, in which they are held by the weight of the dump body 26, by reasons of which the tail gate 58 is held by the described linkage, the same being in properly adjusted condition, securely against the rear sides of the dump body side wall posts 42 in closing relation to the open rear end of the dump body 26.

As seen in FIGURE 3, the projecting side wall posts 42 and guides 44 on the dump body side walls 30 serve to limit sidewise displacements of the connecting rods 118, and prevent their being displaced toward the side walls 30 and guide them in their proper positions, in line with the guide slot 40, so that strains thereon and on the levers are reduced and their straight line operation assured.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the appended claims.

What is claimed is:

1. In combination, a chassis, spaced fixed bracket plates on said chassis, a dump body pivotally mounted on said chassis, said dump body having an open rear end and upstanding sidewalls, a tail gate extending across the open rear end of said dump body between the dump body sidewalls and pivoted on the dump body sidewalls, a pair of tail gate operating units each comprising a transverse rock shaft extending partly across the underside of the dump body and journaled on the dump body, an L-shaped lever fixed on the rock shaft over the adjacent bracket plate, the free end of the lever slidably contacting said bracket plate, linkage comprising an upstanding lever fixed on the rock shaft, flange means fixed on each of the dump body sidewalls and having a longitudinal guide slot through which the adjacent upstanding lever extends and moves, and a connecting rod extending between and pivoted at its ends to said upstanding lever and to the tail gate, said dump body sidewalls each having a projecting post and a projecting guide which serve to space the adjacent connecting rod from the adjacent dump body sidewall and retain it in line with the related guide slot.

2. In combination, a truck chassis having laterally-spaced side members, a fixed horizontal bracket plate on each side member adjacent the rear end thereof, a dump body having a bed with sidewalls rising from said bed and having terminal rear ends defining an open rear end on the dump body, laterally-spaced ribs fixed to the dump body and extending longitudinally therealong beneath said bed, each rib being spaced inwardly from the related sidewall of said dump body, an ear fixed on and depending from each rib, a transverse shaft mounted on the chassis side members at the rear ends thereof on which said ears are pivoted to mount the dump body on the truck chassis for tilting between a fully-depressed horizontal position upon the truck chassis to a fully rearwardly and upwardly-tilted position away from the truck chasis and to intermediate tilted positions, a pendant tail gate extending across the open rear end of said dump body between the dump body sidewalls and pivoted on the dump body sidewalls, said tail gate being gravitationally swingable rearwardly away from the open rear end of the dump body from a closed position in which the gate engages the rear ends of the dump body sidewalls to open positions wherein said tail gate is angled away from the rear ends of the dump body sidewalls, a pair of tail gate operating units each comprising a transverse rock shaft extending partly across the underside of the dump body and journaled on the dump body, an L-shaped lever fixed on the rock shaft over the adjacent bracket plate, the free end of the lever slidably contacting said bracket plate, a linkage comprising an upstanding lever fixed on the rock shaft, flange means fixed on each of the dump body sidewalls and having a longitudinal guide slot through which the adjacent upstanding lever extends and moves, and a connecting rod extending between and pivoted at its ends to said upstanding lever and to the tail gate, said dump body sidewalls each having a projecting post and a projecting guide which serve to space the adjacent connecting rod from the adjacent dump body sidewalls and retain it in line with the related guide slot.

References Cited in the file of this patent

UNITED STATES PATENTS

| | | |
|---|---|---|
| 93,069 | Dengler | July 27, 1869 |
| 728,207 | Currie et al. | May 19, 1903 |
| 1,481,763 | Trimmer | Jan. 22, 1924 |
| 1,588,396 | Winn | June 8, 1926 |
| 1,935,974 | Burner | Nov. 21, 1933 |
| 2,349,153 | Correa | Feb. 5, 1946 |
| 2,732,253 | Birdwell | Jan. 24, 1956 |
| 2,769,662 | Schonrock | Nov. 6, 1956 |

FOREIGN PATENTS

| | | |
|---|---|---|
| 475,456 | France | Feb. 27, 1915 |
| 649,202 | Great Britain | Jan. 24, 1951 |